United States Patent Office 3,532,803
Patented Oct. 6, 1970

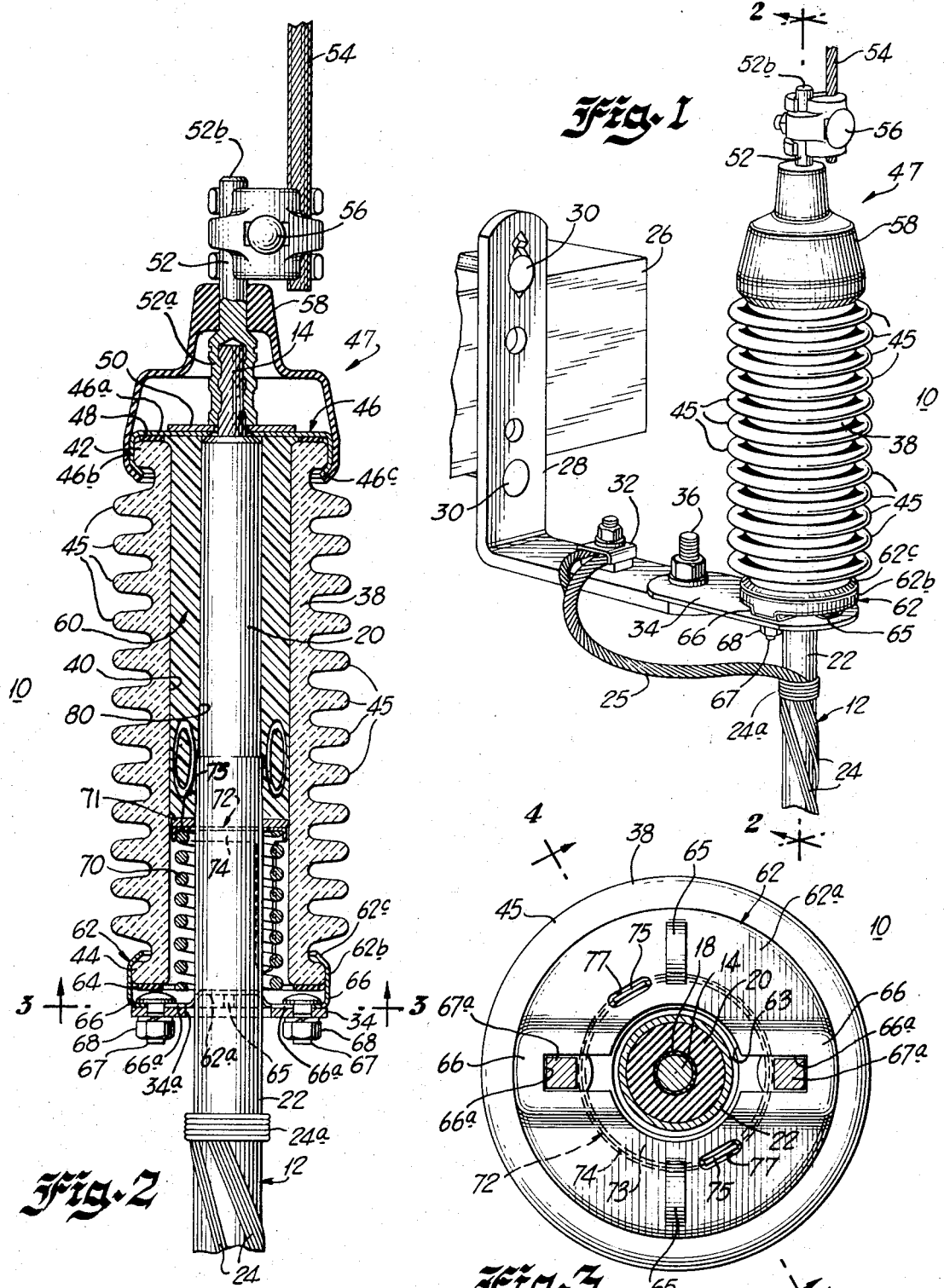

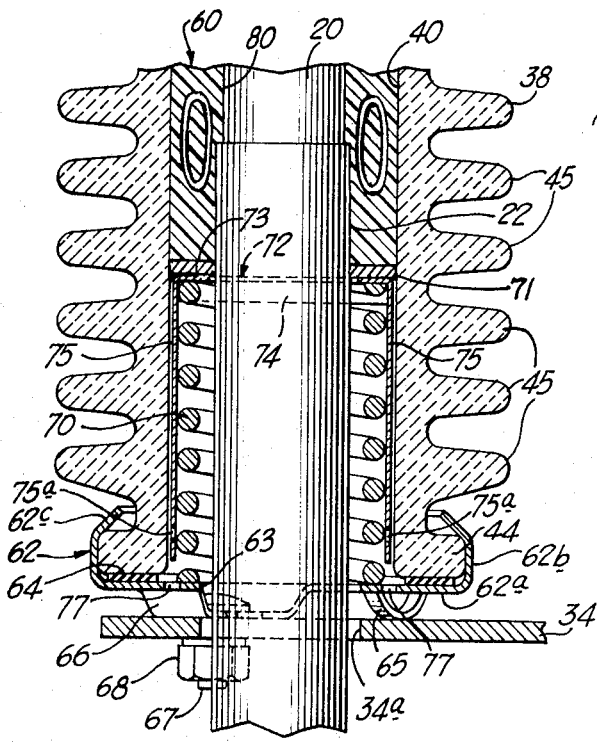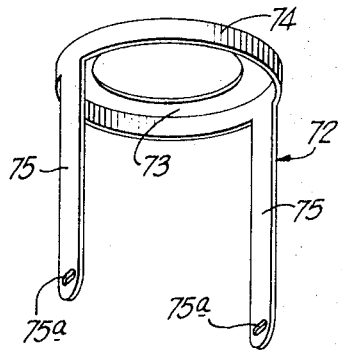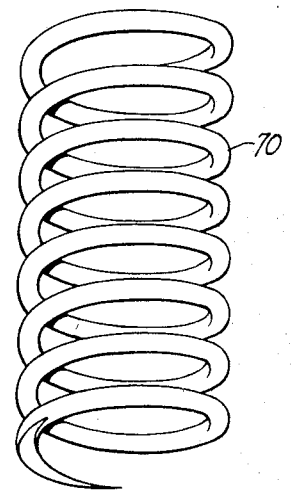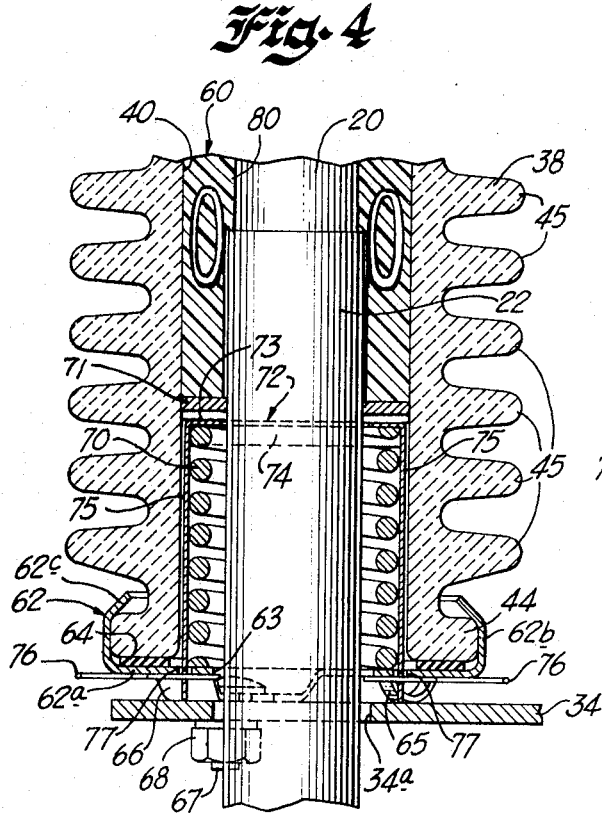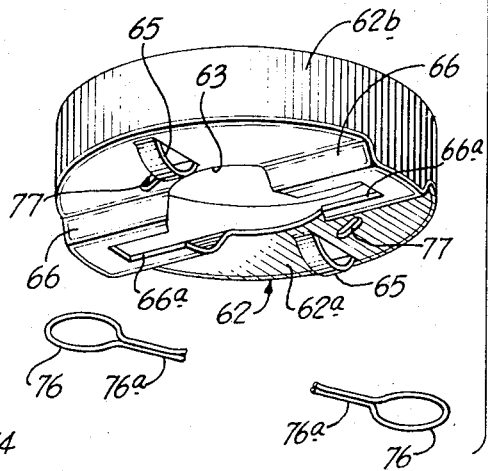

3,532,803
CABLE TERMINAL APPARATUS HAVING A DEFORMABLE FILLER AND RELEASABLE THRUST MEANS
Robert V. Mahon, Downers Grove, and Lawrence W. Schlesser, Evergreen Park, Ill., assignors to Joslyn Mfg. and Supply Co., Chicago, Ill., a corporation of Illinois
Filed Aug. 28, 1969, Ser. No. 853,758
Int. Cl. H02g 15/02
U.S. Cl. 174—73      9 Claims

ABSTRACT OF THE DISCLOSURE

Terminal apparatus for insulated high voltage cable comprising a housing having a cavity, a preformed filler of dielectric deformable material inserted in the cavity and having a bore for receiving an end portion of the cable, and thrust means for exerting compressive force on the filler to obtain substantially air-free interfacial engagement between the filler and the cable. Said thrust means includes a temporarily restrained resilient member for exerting force against a surface of the filler and removable release means externally of the cavity for releasing the restraint on the resilient member after insertion of the cable in the bore of the filler.

---

The present invention relates to a new and improved terminal apparatus for insulated high voltage cable and the like and is an improvement on the terminal apparatus described and shown in U.S. Pat. No. 3,355,541, which patent is assigned to the same assignee as the present invention.

One of the problems associated with high voltage cable and terminal apparatus therefor is that of achieving and maintaining a substantially air-free interfacial engagement between the insulation on the cable and a preformed tubular insulating deformable filler within the cavity of the terminal housing.

It is an object of the present invention to provide a new and improved terminal apparatus for insulated high voltage cable.

Another object of the present invention is to provide a new and improved terminal apparatus for insulated high voltage cable employing a new and improved means for initially establishing and thereafter maintaining a substantially air-free interfacial engagement between an insulating filler within the terminal apparatus and the cable insulation on a terminal end portion of the cable.

Another object of the present invention is to provide a new and improved cable terminating apparatus of the character described which may be easily and rapidly assembled onto the terminal end portion of a cable.

Another object of the present invention is to provide a new and improved cable terminal apparatus which is simple to install and which can be rapidly assembled by a relatively unskilled workman, with excellent results.

The foregoing and other objects and advantages of the present invention are provided in one illustrated embodiment thereof comprising a terminal apparatus for insulated high voltage cable including a housing having a cavity therein. A preformed tubular filler of deformable insulating material is inserted in the cavity and the filler is formed with an axial bore for receiving a terminal end portion of the cable. New and improved thrust means is used for exerting compressive force on the filler to initially obtain and subsequently maintain a substantially air-free interfacial engagement between the filler and the cable when it is inserted within the bore of the filler. The thrust means includes a temporarily restrained resilient member for exerting compressive force against a surface on the filler after release by release means positioned externally of the cavity. After the cable has been inserted into the bore of the filler the release means is actuated to release the restraint on the resilient means which then acts to exert compressive force on the filler to establish and maintain a substantially air-free interfacial engagement between the bore of the filler and the cable insulation within the terminal housing. Insertion of a prepared terminal end portion of the cable into the bore of the filler inside the terminal housing is easy and rapid and, after insertion, the restraint on the resilient member is released and a substantially air-free interfacial engagement is established and maintained between the bore of the filler and a terminal end portion of the cable insulation.

For a better understanding of the invention, reference should be had to the following detailed description taken in conjunction with the claims and the drawings, in which:

FIG. 1 is a perspective view illustrating a new and improved, fully assembled cable terminating apparatus characterized by the features of the present invention;

FIG. 2 is a longitudinal sectional view through the terminal apparatus taken substantially along line 2—2 of FIG. 1;

FIG. 3 is a transverse sectional view of the apparatus taken substantially along line 3—3 of FIG. 2;

FIG. 4 is an enlarged, fragmentary, sectional view of the lower end portion of the terminal apparatus taken substantially along line 4—4 of FIG. 3 and illustrating the apparatus after the restrained resilient member has been released to exert compressive force against the deformable insulating filler;

FIG. 5 is a view similar to FIG. 4 but illustrating the apparatus before restraint on the resilient member has been released; and FIG. 6 is an exploded perspective view showing a resilient force exerting member and components for releasably restraining the same, characterized by the features of the present invention.

Referring now, more particularly, to the drawings, therein is illustrated a new and improved cable terminating apparatus 10 constructed in accordance with the features of the present invention and especially adapted for use in terminating high voltage insulated cables, such as the cable 12. The cable 12 includes a central or inner conductor 14 and an inner conducting shield 18 (FIG. 3) is formed around the central conductor 14. The inner conducting shield 18 is surrounded by cable insulation 20. Around the insulation 20 the cable is provided with an outer, coaxial, conductive shield 22 which is commonly maintained at ground potential so that the dielectric stress gradient in the insulating cover 20 between the inner shield 18 and the outer shield 22 is relatively uniform and symmetrical throughout the length of the cable. Outer shielding means here shown as a plurality of wires 24 are spirally wound around the exterior of the outer shield 22 to complete the outer shield system of the cable and, as shown in FIGS. 1 and 2, the spiral disposition of the outer ground wires 24 is discontinued short of the terminal apparatus 10 in any suitable manner as by taking one of the individual conductors 24a and winding it around the cable. The other outer conductors 24 are woven into a separate grounding cable 25 (FIG. 1) which is attached to a point of ground potential if the outer shielding system is to be grounded.

The terminal apparatus 10 is normally supported from a cross arm 26, or the like, and an L-shaped grounding bracket 28 having a vertical leg is secured to the cross arm by a plurality of bolts 30. The bracket includes a horizontal leg extending outwardly for supporting the base of the terminal apparatus 10, and the outer end of the woven grounding wire 25 is electrically connected to the support bracket 28 by a bolt and a ground clamp assembly, generally indicated by the reference numeral 32 in FIG. 1. The terminal assembly apparatus is supported in an upright vertical position on a separate support plate 34, which plate is secured to the outer end of the horizontal leg of the bracket 28 by a fastener 36.

The terminal apparatus 10 includes an elongated, hollow, terminal housing, constructed of rigid insulating material, such as wet process porcelain having a glazed outer surface which is able to withstand outside weather conditions for long periods of time without deterioration. The housing 38 is formed with a generally cylindrical, uniform diameter, elongated axial bore 40 extending between the upper and lower ends thereof, and the bore or cavity 40 is open at opposite ends in order to receive a prepared terminal end portion of the cable 12 inserted therein. The outer surface of the housing is formed with a radially outwardly extending annular ridge or ring 42 adjacent the upper end and a similar ring 44 at the lower end, and intermediate the end rings 42 and 44 there is provided a plurality of spaced apart intermediate rings 45 in the usual fashion. The upper end of the housing bore 40 is closed by an upper terminal assembly 47 which includes a cup-shaped conductive cap member 46 having a circular end wall 46a with a central opening therein for accommodating a short upwardly projecting portion of the central conductor 14 of the cable. The cap member 46 includes a downwardly extending, integrally formed, generally cylindrical skirt portion 46b surrounding the upper end ring 42 on the housing, and the cap member is permanently secured in place on the upper end of the housing by inward deformation of the lower edge portion of the skirt, as at 46c, to bear against the lower corner edge of the end ring 42. A resilient cushioning washer 48 is disposed between the lower surface of the terminal cap wall 46a and the annular upper end face of the porcelain housing 38.

After a terminal end portion of the cable 12 has been properly prepared by stripping back portions of the insulation and the outer shield, the cable is inserted upwardly into the bore 40, as shown in FIG. 1, and the upper end of the cable insulation 20 terminates at a point level with the lower surface of the cap wall 46a. The short, uncovered portion of the central conductor 14 of the cable projects upwardly through the central opening in the cap wall 46a and through the central opening in a bearing washer 50 into an elongated, axial socket 52a formed in the lower end of a compression connector 52. The compression connector 52 is lowered onto the exposed projecting end portion of the central conductor 14, and the connector is then compressed or crimped with a suitable crimping tool, thus connecting the central conductor of the cable with the upper terminal of the apparatus. The compression connector includes an upwardly extending shank portion 52b adapted for easy connection with a cable 54 or other conductor by suitable means such as a cable clamp assembly 56. The cap member 46, washer 50, and lower end portion of the connector 52 are enclosed by a removable flexible cover 58 formed of semi-conducting rubber or other suitable material, and only a short upper portion 52b of the connector remains exposed for connection with the cable 54.

In accordance with the present invention, an elongated tubular dielectric filler 60, constructed of deformable, rubber-like material is mounted in the bore 40 of the housing 38 with the upper end of the filler bearing against the lower surface of the end wall 46a of the upper terminal cap member 46. The deformable filler is constructed of elastic insulating material having high dielectric strength and, when in place in the housing 38, occupies a substantial portion of the total length of the bore 40. The length and wall thickness of the tubular elastic filler, as well as the diameter of the internal bore 40 of the housing and the length of the housing 38, is determined largely by the working voltage to be applied with the cable 12, and in higher voltage applications greater lengths and thicknesses are required.

The lower end of the porcelain housing 38 is provided with a lower cap member 62, generally similar to the upper cap member 46, and includes a circular bottom wall 62a with a central opening 63 for the cable and an upwardly extending, generally cylindrical skirt wall 62b which is disposed to surround the lower end ring 44 on the porcelain housing. In order to permanently secure the lower terminal cap member 62 in place on the housing, an upper edge portion of the skirt wall 62b is deformed inwardly, as at 62c, to bear against the upper corner of the lower end ring 44, as shown. A cushioning washer 64 of resilient material is disposed between the lower end of the housing and the upper surface of the end wall 62a of the lower terminal cap. The projections 65 may serve as connection points for the shielding means 24 if desired.

In accordance with the present invention, the lower cap member 62 is formed with a first pair of downwardly extending, curved, spacing projections 65 struck from the end wall 62a at diametrically opposite sides of the center opening 63. Each projection is formed by cutting a pair of parallel slits in the wall 62a and deforming the material between the slits into the arcuately curved spacers, as best shown in FIG. 6. In addition to the struck out spacer projections 65, a pair of larger, downwardly extending, troughlike spacing deformations 66 are integrally formed in a stamping operation, or the like, and these troughlike spacer projections are located on diametrically opposite sides of the center opening 63. The troughlike spacer deformations 66 are arrayed on a diametrical line generally perpendicular or normal to a diametrical line extending through the pair of arcuately curved projections 65 so that a total of four equilaterally spaced, downwardly depending projections are provided to space the end wall 62a upwardly above the upper surface of the supporting plate 34 when the terminal apparatus 10 is mounted thereon in the normal upright position; as shown in FIGS. 1, 2, 4, and 5.

The supporting plate 34 is formed with an opening 34a for accommodating the cable 12 which extends upwardly therethrough, and the terminal apparatus 10 is attached to the support plate with a pair of bolts 67, each having a head and square shank portion 67a (FIG. 3). The troughlike spacer deformations 66 of the terminal cap 62 are formed with radially outwardly extending slots 66a (FIG. 6) which extend in diametrically opposite directions from the central opening 63. The heads of the mounting bolts 67 are seated in the troughlike spacer projections, and the square portions 67a of the shanks are restrained against rotation by engagement with the opposite edges forming the slots 66a. The bolts project downwardly through holes provided in the plate 34, and nuts 68 are tightened onto the lower ends of the bolts below the plate to securely support the apparatus in place, as shown. The radially spaced, downwardly depending spacer projections 65 and 66, formed on the cap 62, provide space between the main portion of the end wall 62a of the cap and the upper surface of the mounting plate 34 for a purpose to be described hereinafter.

In accordance with the present invention, the lower end of the filler 60 is spaced above the lower end of the housing 38, and the lower end portion of the cylindrical bore 40 below the filler is occupied by an annular, coiled compression spring 70 which is adapted to exert compressive force upwardly against the annular lower end face of the filler through a thrust washer 71. The compressive end force against the filler initially establishes and thereafter maintains a substantially air-free interfacial engagement between the internal surface of the bore of the filler and the insulation jacket on the terminal end portion of the cable inserted into the terminal apparatus.

In order to aid in the installation and termination of the cable 12 in the terminal apparatus 10, the compression spring 70 is maintained in a restrained or compressed condition, as shown in FIG. 5, until after the prepared terminal end portion of the cable has been fully inserted and the compression fitting 52 has been secured in place with a crimping tool. For the purpose of temporarily restraining the spring 70 until installation of the terminal apparatus 10 with a cable 12 in the field, a restraining member 72 (FIG. 6) formed of stamped sheet metal or other material of suitable strength and one or more of releasable keys 76 are used in conjunction with the lower cap member 62. The restraining member 72 comprises an annular upper end face 73 having a central opening therein for accommodating the cable and a short downwardly depending, integral, cylindrical skirt 74 for engaging and holding the upper convolution or turn of the spring in coaxial alignment with the longitudinal axis of the elongated bore 40 in the housing 38. A pair of downwardly depending parallel tension members or legs 75 are formed with the skirt 74 and the legs are disposed to extend longitudinally of the coiling axis of the spring on opposite sides thereof. The legs 75 maintain an initial compression or restraining force on the spring 70 by compressing the spring between the annular ring portion 73 and the lower end wall 62a of the lower terminal cap. The lower ends of the tension legs 75 extend downwardly through slots 77 in the cap wall 62a and are formed with slots 75a (FIG. 6) to receive key portions 76a of removable release keys 76 which are formed of wire or other suitable material. When the terminal apparatus 10 is initially assembled or manufactured, the spring 70 is initially compressed to a shorter length than normal by exerting compression between the annular end ring 73 of the retainer 72 and the lower end wall 62a of the terminal cap 62. After the desired spring compression is obtained, the lower end portions of the legs 75 extend downwardly through the slots 77 in the end wall 62a of the cap 62, and the key pins 76a of the release keys 76 are inserted into the slots 75a in the legs below the lower surface 62a of the cap member. The external compression force is then removed and the spring 70 is maintained in a compressed or restrained condition by the retainer 72, cap member 62, and release keys 76 until the latter are removed and released during assembly or installation of a cable in the terminal apparatus.

The tubular elastic dielectric filler 60 is formed with a substantially cylindrical, elongated bore 80 extending between opposite ends for receiving a prepared terminal end portion of the cable and the diameter of the bore is stepped to be approximately equal to the stepped outer diameter of the prepared cable when the filler is not subjected to compression (FIG. 5). The cable is inserted into the apparatus after being prepared by stripping back the insulation 20 and the outer conducting sheath 22 a preselected distance from the end, as shown in FIG. 1, and is moved upwardly through the bore 80 of the filler until the short upper end exposed portion of the central conductor 14 extends upwardly through the end wall 46a of the upper cap 46. The compression connector 52 is inserted onto the central conductor 14 above the washer 50, and the socket portion 52a is compressed with a crimping tool to positively hold the cable in place in the terminal apparatus 10.

Insertion of the prepared terminal end portion of the cable 12 through the bore 80 of the filler 60 is free, as illustrated in FIG. 5, because the compression spring 70 is restrained longitudinally by the release keys 76, the pin portions 76a of which are engaged in the slots 75a in the lower end portions of the legs beneath the wall 62a of the lower terminal cap 62. Because of the restraint, no significant stress or force is exerted by the spring 70 against the thrust washer 71 or lower end face of the dielectric filler 60, which is in a relaxed or noncompressed condition.

After the compression connector is crimped in place, the release keys 76 are disengaged from the slots 75a in the legs 75 by grasping the loops of keys and pulling the keys outwardly. The spacer projections 65 and 66 provide ample spacing to facilitate withdrawal of the pin portions 76a from the slots 75a in the lower end of tension legs 75. Upon disengagement between the keys and legs, the restraining force on the spring 70 is released and the spring expands upwardly from the compressed condition (FIG. 5) to the normal, expanded position (FIG. 4) and a sizable compression force is exerted upwardly against the annular lower end face of the elastic filler 60. Because the filler member 60 is formed of deformable elastic material, the length of the filler is reduced by the spring force and the internal diameter of the bore 80 contracts around the cable insulation 20 and conforms to fit over a short length of the outer shield 22. As this contraction occurs, substantially all of the air is expunged from between the surface of the bore 80 in the filler 60 and the adjacent confronting surfaces of the cable insulation 20 and outer conducting sheath 22. Because the restraining force on the compression spring 70 is removed only after insertion of the prepared terminal end portion of the cable into the filler is completed, the initial insertion of the cable into the bore of the filler is free and easy. After the restraining force on the spring 70 is released, the spring acts to continually maintain the substantially air-free interfacial engagement that has been established between the cable and filler even though temperature changes result in expansion and contraction of the various components of the terminal apparatus, especially the filler 60.

The terminal apparatus 10 provides for easy insertion of the cable and the rapid initial establishment of a substantially air-free interfacial engagement between a deformable insulating filler 60 and an end portion of the cable. The substantially air-free interfacial engagement between the filler and cable is maintained by a resilient compression force acting on the filler 70 to accommodate expansion and contraction of component parts due to changes in ambient temperature conditions. During the initial insertion of the stripped back terminal end portion of the cable into the terminal apparatus, lubricating dielectric grease is applied to the surface of the cable to facilitate the free and easy insertion of the cable end portion through the bore of the filler and expulsion of the air. Later on, when the restraining force on the compression spring is released by withdrawal of the keys, the grease facilitates expulsion of any air between the confronting surface of the cable and filler, and the grease aids in maintaining the substantially air-free interfacial engagement between the filler and cable during expansion and contraction of the component parts caused by changes in ambient temperature.

What is claimed as new and desired to be secured by Letters Patent of the United States is:

1. Terminal apparatus for insulated high voltage cable comprising a rigid housing having a cavity; a preformed dielectric elastic filler in said cavity having a bore for receiving an end portion of said cable; and thrust means for exerting compressive force on said filler to obtain a substantially air-free interfacial engagement between said filler and said cable, said means including an initially restrained resilient member for exerting force against a surface of said filler when restraint is released, and release means externally of said cavity for releasing said restraint on said resilient member after insertion of said cable in the bore of said filler.

2. The apparatus of claim 1 wherein said thrust means includes a cap member mounted on said housing at one end of said cavity, a restraining member extending outwardly of said cap member and restraining said resilient member, said release means engaged with said restraining member and said cap member and manually removable from engagement with the former to release restraint on said resilient member.

3. The apparatus of claim 1 wherein said filler includes an annular end face, said restraining member comprising a helically coiled compression spring disposed coaxially with the bore of said filler and having one end exerting thrust toward said end face of said filler, and restraining means extending parallel to the longitudinal axis of said spring and engaging said release means.

4. The apparatus of claim 3 wherein said thrust means includes an annular cap member on said housing at one end of said cavity for receiving thrust from the compression spring, said restraining means extending outwardly of said cap member in releasable engagement with said release means.

5. The apparatus of claim 4 wherein said release means includes at least one key pin bearing against said cap member and extended through a slot means formed in said restraining means, said key member being releasable radially outwardly of said housing to disengage said release means and release said spring to deform said filler around said cable when said cable is inserted.

6. Terminal apparatus for insulated power cable comprising a housing having a cavity; a tubular elastic dielectric filler having an axial bore for receiving an end portion of said cable; and a pair of annular, force exerting means at opposite ends of said filler for exerting compressive stress thereon for establishing air-free interfacial engagement between the bore of said filler and said cable, one of said force exerting means including a restrained resilient member and release means externally of said cavity manually releasable to remove restraint on said resilient member after insertion of said cable into the bore of said filler.

7. The apparatus of claim 6 wherein said resilient member comprises a helical compression spring in coaxial alignment with the bore in said filler, an annular restraining member bearing against an inner end of said spring and including a pair of elongated tension members extending on diametrically opposite sides and parallel to the longitudinal axis of said spring outwardly of said cavity, cap means mounted on said housing closing one end of said cavity and including slots therein receiving outwardly projecting end portions of said tension members, said release means comprising a pair of removable keys, each key engaging a portion of a tension member and an outer surface of said cap means until released.

8. The apparatus of claim 7 wherein said keys are releasable by withdrawal in a direction radially outwardly of the housing, said end portions of said tension members including slot defining means therein receiving said keys.

9. The apparatus of claim 8 in combination with a mounting base for said apparatus extending in a plane normal to said housing and adjacent said cap means, said cap means including spacer means engaging said base at radially spaced points on an outer face thereof and disposed on opposite sides of said slots for said tension members, thereby permitting free release of said keys outwardly from between said base and cap means.

References Cited
UNITED STATES PATENTS

| | | | |
|---|---|---|---|
| 3,318,992 | 5/1967 | Huber | 174—73 |
| 3,335,215 | 8/1967 | Huber | 174—73 |
| 3,355,541 | 11/1967 | Hornberger | 174—73 |

LARAMIE E. ASKIN, Primary Examiner

U.S. Cl. X.R.

174—75